United States Patent [19]

Mauchan et al.

[11] Patent Number: 4,855,770
[45] Date of Patent: Aug. 8, 1989

[54] VEHICLE IDENTIFICATION CAMERA

[75] Inventors: Donald E. Mauchan, Marlboro; Frederick Slavitter, Needham, both of Mass.

[73] Assignee: Polaroid Corporation, Cambridge, Mass.

[21] Appl. No.: 242,178

[22] Filed: Sep. 9, 1988

[51] Int. Cl.[4] .................... G03B 11/00; G03B 15/03
[52] U.S. Cl. ................................ 354/75; 354/126; 354/295
[58] Field of Search ............... 354/75, 76, 81, 295, 354/126

[56] References Cited

U.S. PATENT DOCUMENTS

| | | | |
|---|---|---|---|
| 2,314,829 | 3/1943 | Hunter | 67/29 |
| 2,433,129 | 12/1947 | Land | 250/65 |
| 3,195,431 | 7/1965 | Augustin, Jr. et al. | 95/11 |
| 3,263,584 | 8/1966 | Knus | 95/11 |
| 3,514,206 | 5/1970 | Harvey et al. | 355/67 |
| 4,701,039 | 10/1987 | Johnson | 354/80 |

*Primary Examiner*—Michael L. Gellner
*Attorney, Agent, or Firm*—David R. Thornton; Alfred E. Corrigan

[57] ABSTRACT

A vehicle identification camera arrangement for photographing a vehicle identification number (VIN) plate through a vehicle windshield includes a housing having an object window at its distal end forwardly of the lens and an aperture stop adjoining the lens with the length of housing from the lens establishing the distance to the windshield. The aperture stop sufficiently reduces the aperture to increase the depth of field to encompass the variations in distance of the VIN plate behind the vehicle windshield. Preferably, the arrangement is provided as an adapter housing whose interior is divided into an upper lightbox section and a lower exposure section by an opaque baffle and a diffusing screen. The lightbox section receives flash illumination and directs it at a sharp angle with respect to the optical axis of the camera objective to illuminate the VIN plate through the windshield with a minimum of reflection from the windshield along the camera exposure axis. Optionally, the housing includes an arrangement for mounting an information label adjacent the object window to provide for the production of composite VIN plate and information image exposures.

21 Claims, 3 Drawing Sheets

VEHICLE IDENTIFICATION CAMERA

BACKGROUND OF THE INVENTION

This invention relates to photographic apparatus and, more particularly, it concerns camera apparatus for close-up photography particularly of a vehicle identification number plate through the windshield of the identified vehicle.

A vehicle identification number (hereinafter "VIN") is a lengthy combination of letters and numerals stamped on a small metallic plate, for example, about ½ inch in width and 4 inches in length, which is attached to the interior of the vehicle when the vehicle is manufactured. Each vehicle has its own unique VIN so that it can be properly identified even though altered in other material respects, such as by repainting, or by structural modification. The VIN plate is commonly located on the driver's side of the vehicle between the dash and the windshield near the lower edge of the windshield. While the VIN plate may be differently positioned behind the windshield, it is universally intended to be read through the windshield rather than from the vehicle interior.

Because of the lengthy and generally random combination of alphanumeric characters used in VINs, manually copying of a VIN is likely to result in errors. Also manual or visual comparison of the VIN with a record of the same number is adequately difficult to facilitate fraudulent misrepresentations about the vehicle to insurance companies, law enforcement agencies, vehicle licensing authorities and the like. Accordingly, much interest has been expressed for photographic equipment by which a permanent record of the VIN may be made photographically.

One known accessory which attempts to solve some of the problems associated with photographing a VIN plate using a conventional camera having an objective lens and a built-in strobe includes a tube, a close-up lens and a pair of polarizing filters. The length of the tube sets the camera to windshield distance in correspondence with the shortening of the focal length of the camera objective brought about by the close-up lens. To control windshield reflection which would otherwise occur during a flash exposure of the VIN plate, one of the polarizing filters is mounted over the strobe and the other polarizing filter is mounted over the close-up lens with the plane of oscillation of the polarizing filter over the lens being offset with respect to that of the polarizing filter over the strobe. These polarizing filters reduce the amount of light available to expose the film to less than one half the initial strobe output. The close-up lens not only reduces the focal length of the objective lens, but also produces a very short depth of field, for example, about ¼" at a 4" focal distance using the accessory with a Sun 600 LMS camera marketed by Polaroid Corporation of Cambridge, Massachusetts. This short depth of field cannot accommodate variations in VIN plate location and results in poor quality, out-of-focus VIN plate images.

In light of theforegoing, there is a need for an improved vehicle identification camera for photographing a VIN plate through a windshield.

SUMMARY OF THE INVENTION

In accordance with the present invention, a vehicle identification camera for photographing a VIN plate through a windshield is provided by which variations in location of VIN plates is accommodated by an increase in the depth of field brought about by an aperture stop. Use of a small aperture stop is made possible by utilizing an elongated aperture slot in conjunction with a flash confining and directing system which optimizes the amount of light available to expose the film. Advantageously, the increase in the depth of field provides for the production of composite VIN plate and data image exposures.

The vehicle identification camera of the present invention is preferentially provided by an adapter particularly, though not exclusively, adapted for use with a conventional fixed-focus instant camera having an objective lens and a built-in electronic flash unit. The adapter includes a box-type housing having an object window at one end and a close-up lens, aperture stop, mounting clamp and flash illumination receiving opening at the other end. The interior of the housing is divided into an upper light box section and a lower exposure section by an opaque baffle and a flash diffusing screen. When the adapter is mounted in an operative position on the front of the camera, substantially all of the flash illumination produced by the electronic flash unit passes through the illumination receiving opening and into the light box. This confined illumination is reflected by a mirror on the upper surface of the light box and directed out of the light box through the diffusing screen at a sharp angle with respect to the optical axis of the camera objective.

The optical axis of the close-up lens and the aperture stop are co-axially aligned with the optical axis of the objective lens. The close-up lens shortens the focal length of the objective lens to a distance about one inch beyond the length of the housing. The aperture stop increases the depth of field of the camera objective lens to several inches. This increased depth of field accommodates not only variations in VIN plate location with respect to the windshield in different vehicles, but also provides for a sharp, clear, composite image of the VIN plate and additional identification information on an information bearing label supported adjacent the object window.

A preview illuminator having an incandescent light and a manually operable activating switch is mounted in the exposure section adjacent a side opening. A camera operator actuates the preview illuminator to illuminate the VIN plate through the windshield while the operator positions the adapter and camera combination over the VIN plate.

Accordingly, a principal object of the present invention is to provide a camera or an adapter for a camera for photographing an auto VIN plate through the auto windshield. Another object of the present invention is the provision of an adapter for a conventional instant camera embodied in a unitary snap-on housing which can be readily attached to and detached from the camera as needed. Other objects and further scope of applicability of the present invention will become apparent from the detailed description to follow taken in conjunction with the accompanying drawings in which like parts are designated by like reference characters.

DETAILED DESCRIPTION OF THE PREFERRED EMBODIMENT

Figure 1:
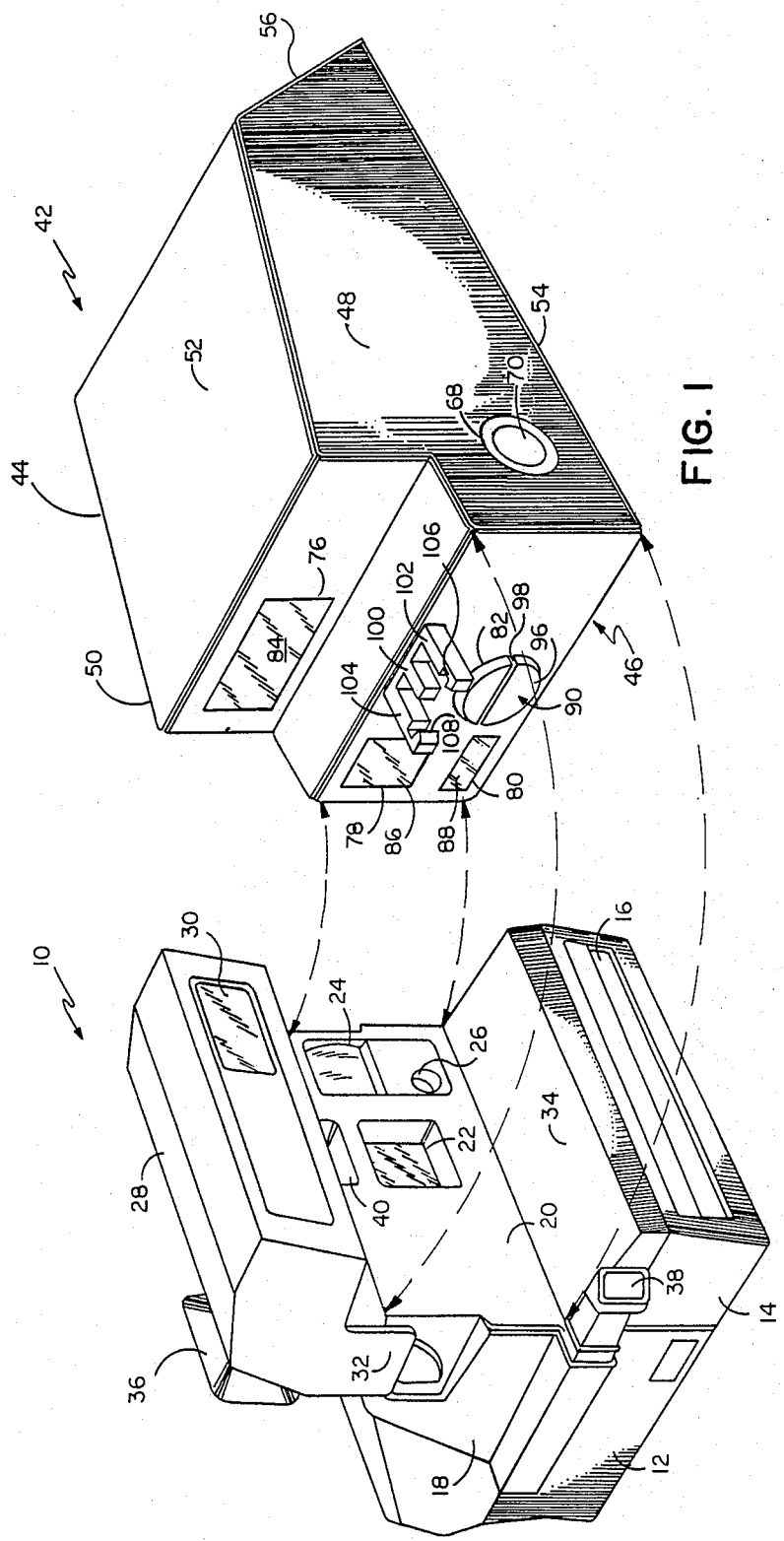
FIG. 1 is an exploded perspective view illustrating a camera and a vehicle identification adapter of the present invention.

In FIG. 1 of the drawings, an exemplary instant camera with which the adapter arrangement of the present invention is particularly though not exclusively suited for use, is designated generally by the numeral 10 and is similar in all basic respects to the 600 LMS camera marketed by Polaroid Corporation of Cambridge, Mass. The camera 10 includes a base section 12 which extends forwardly to a pivoted loading door section 14 through which a film pack (not shown) is loaded for exposure of successive film units within the pack and discharge of each film unit after exposure through a film unit exit slot 16. An exposure housing section 18 projects upwardly from the base section 12 and includes a front surface 20 which accommodates an objective lens 22, a viewfinder lens 24, and a photocell window 26. A built-in fold away electronic flash unit 28 includes a flash emitting element 30 and is pivotally supported at depending end wall leg portions 32 from the shutter housing 18 for movement between an erect position illustrated in FIG. 1 and a folded down position (not shown) against an apron wall 34 which extends from the front surface 20 of the exposure housing section 18 to the front portion of the loading door section 14. A viewfinder eye piece 36 projects rearwardly from the shutter housing section 18. An exposure cycle initiating push button 38 is supported between the exposure housing section 18 and the base section 12. The upper surface of the exposure housing 18 has a recess 40 which is adapted to receive a cable housing (not shown) when the flash unit 28 is placed in a folded down position (not shown) against the apron wall 34.

Figure 2:
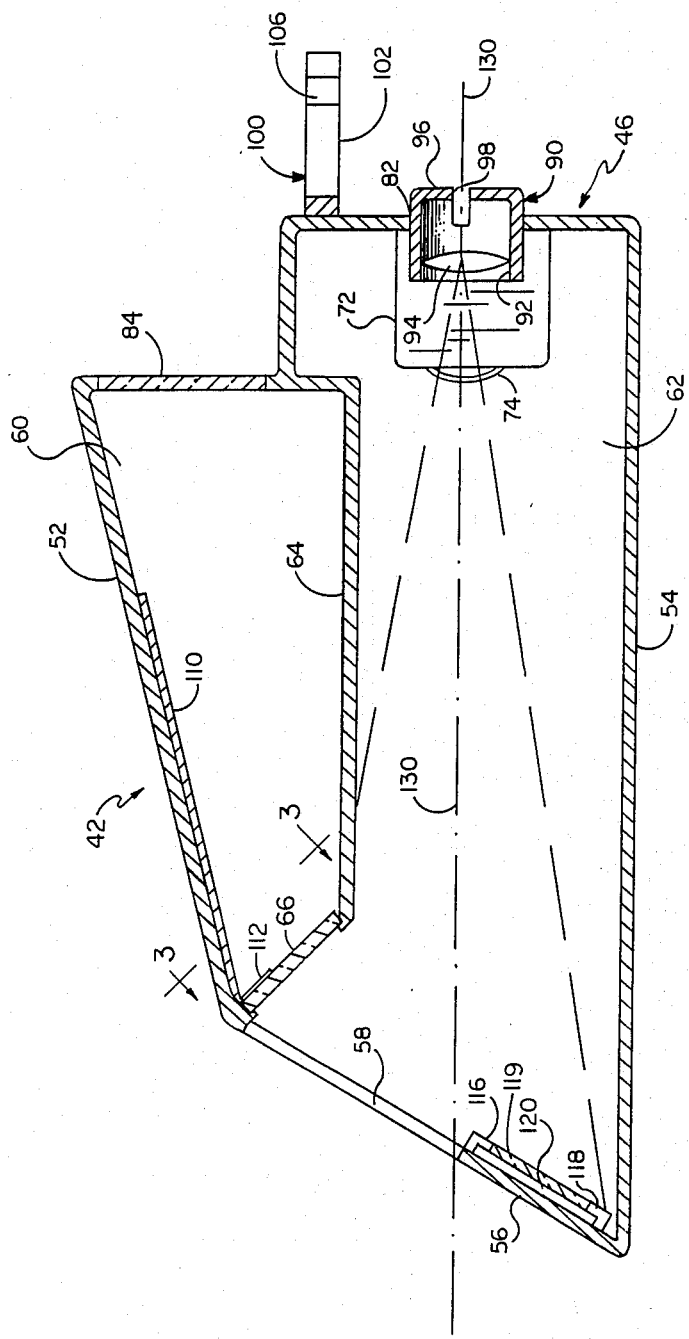
FIG. 2 is an enlarged cross-section taken along the midline of the adapter of FIG. 1.
Figure 3:
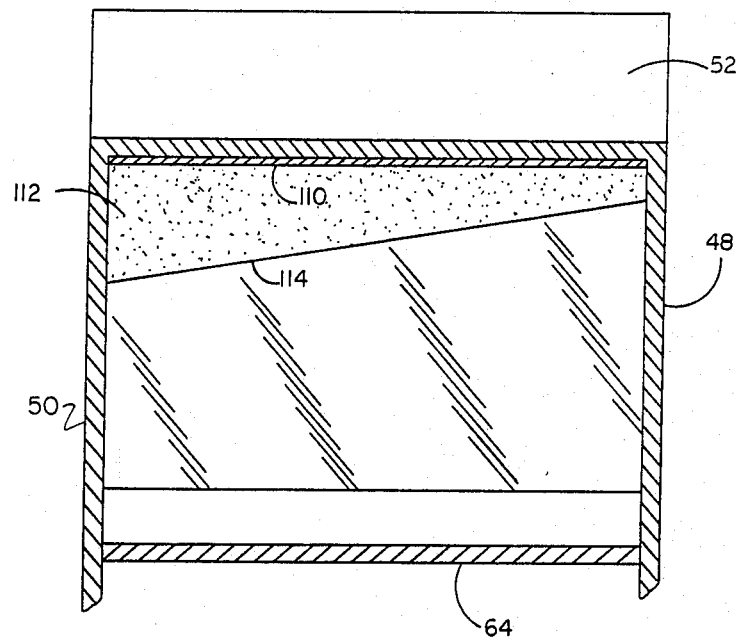
FIG. 3 is an enlarged cross-section on line 3—3 of FIG. 2.

In FIGS. 1 and 2 of the drawings, an adapter in accordance with the preferred embodiment of the present invention is generally designated by the reference numeral 42 and shown to include an opaque, tubular housing 44 having a generally rectangular and stepped back wall 46, a pair of substantially parallel side walls 48 and 50, top and bottom walls 52 and 54, respectively, and a front wall 56 having a rectangular object window 58. As shown most clearly in FIG. 2 of the drawings, the front wall 56 extends upwardly at an acute angle with respect to the bottom wall 54. The top wall 52 forms an obtuse angle with the front wall 56 and an acute angle with the upper portion of the back wall 46. The interior of the housing 44 is divided into an upper light box section 60 and a lower exposure section 62 by an opaque baffle 64 and a diffusing screen 66, such as a frosted glass plate, which extend between the side walls 48 and 50 (FIG. 3). The interior walls of the light box section 60 are made white to maximize light transmission, whereas the interior walls of the exposure section are made black to minimize flare.

The side wall 48 has a circular opening 68 for accommodating a built-in pressure switch 70 of a preview illuminator 72 mounted in a corner of the exposure section 62 defined by the back wall 46 and side wall 48. The preview illuminator 72 includes an incandescent bulb 74 and a battery (not shown).

The back wall 46 has three rectangular openings 76, 78, 80 and one circular opening 82 supporting, respectively, a light box window 84, a viewfinder optical wedge 86, a photocell optical wedge 88, and a close-up lens and aperture stop supporting and defining member 90. The member 90 is cylindrical and has an open end 92 which supports a close-up lens 94 and a closed end 96 having an aperture defining medial slit 98. A mounting clamp 100 is fixedly attached to the back wall 46 above the aperture stop 90. The mounting clamp 100 is formed of a resilient plastic material so that the adapter 42 can be readily attached to and detached from the front face of the camera 10. The clamp 100 includes a pair of arms 102 and 104, each having a respective groove 106 and 108 adapted to receive a respective edge of the cable housing (not shown) which extends between the shutter housing section 18 and the flash unit 28 at the rear of the recess 40. Although as illustrated and described herein the adapter 42 is of a snap-on type adapted to be readily attached and detached from a camera, it is contemplated and will be understood by those skilled in the art that with minor modifications the adapter 42 may be incorporated as a permanent part of a camera dedicated to photographing VIN plates.

In FIGS. 2 and 3 of the drawings, a reflector or mirror 110 is shown mounted on the lower surface of the top wall 52 in a position adjacent the diffusing screen 66 and opposite the light box window 84. A light modulator 112 is attached to the upper portion of the diffusing screen 66 adjacent the reflector 110. The light modulator 112 has an angled contour 114 so that the modulator is wider at the end adjacent the side wall 50 than at the end adjacent the side wall 48. The modulator 112 may be, for example, an opaque coating applied to a select portion of the screen 66.

The reflector 110 and the diffusing screen 66 are mounted with respect to the adapter 42 to direct the illumination from strobe 30 through the object window 84 at an angle of approximately 30° to form a shadow from the numbers on the VIN plate and thus enhance recognition of the numbers in the photograph. The front wall 56 at the distal end of the adapter 42 is located in a plane which is approximately 120° to the optical axis 130 so as to minimize or essentially preclude reflections from the vehicle windshield to the lens 22 of the camera 10 when the camera and adapter are assembled and placed in engagement with the vehicle windshield, as later explained in detail with regard to FIG. 4, while enhancing viewing and photographing of the auto VIN plate through the conventionally inclined windshield. To accommodate the inclined face 56, while directing the illumination to the windshield at the above-noted 30°, the reflector 110 is mounted at an angle of approximatly 20° to the optical axis 130. Thus, it should be understood that the camera strobe 30, in conjunction with the reflector 110 and diffusing screen 66, provide means for producing a pulse of exposure illumination and for directing the illumination through the object window 58 and the vehicle windshield to illuminate the VIN plate therebehind. Advantageously, the inclined illumination also serves to illuminate an information label 120 mounted below the object window 58 as explained in detail below.

As illustrated and described, the adapter provides a fully light-tight assembly, and while the latter is preferred to eliminate spurious light from reaching the exposure angle of the lens, an opaque enclosure is not an absolute necessity. Functionally, the adapter section 62 spaces the camera lens a predetermined distance, frames the scene area to be photographed, and with the inclined front wall 56 minimizes and/or precludes windshield reflections from reaching the lens. Much of the spurious light which could enter the lens exposure angle tends to eminate from areas adjoining the distal end of the adapter or, that is, near the object window. Consequently, it is preferable that at least some portions of the adapter section 62 near its distal end be light blocking, but as the lens end of this section is approached, there is less concern with light blocking. A similar concern also applies to the adapter section 60. Thus, an opaque enclosure is more necessary or desirable near the distal end of this section than at its end bordering the flash window 84.

Figure 4:
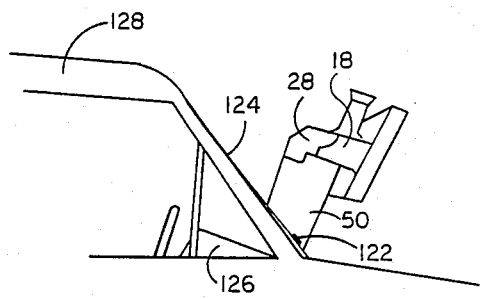
FIG. 4 is a schematic side elevation representation of the camera and adapter of FIG. 1 in an operative position over a vehicle windshield.

With reference to FIGS. 2 and 4, a pair of L-shaped brackets 116 and 118 are attached to the inner surface of the front wall 56 below the object window 58 for supporting an information bearing label 120. Additionally, a neutral density filter 119 is affixed to the brackets 116 and 118 to reduce the flash illumination of the label to approximately one-quarter of its expected illumination in order to compensate for its shorter distance as compared to the VIN plate distance. The side wall 50 includes a slit or cut-out 122 which provides for insertion and removal of the label 120 into and from the brackets 116 and 118. It is to be understood that the label 120 has a length greater than the width of the housing 42 by an amount sufficient to provide a tab which extends from the housing and is easily grasped by a camera operator and that an information bearing portion of the label 120 corresponds to the width of the object window 58.

The information on label 120 can be the name of the state agency, insurance company or other entity, as well as that of the vehicle owner, or other information pertinent to the recording operation. The use of a lable is, of course, optional and can be omitted. In regard to the latter, as illustrated, the label support is permanently secured in the front wall 56. However, to accommodate photographing of larger identification plates, such as those found on vehicle door jambs, the section of the wall 56 carrying the label brackets 116 and 118 may be hinged to the adapter base 54 to allow it to swing away from the adaptor front and thereby extend the object window 58 to the base 54. Alternatively, this portion of the front wall 56 may be formed as a removable member releasably secured to the adapter 42 for mounting select labels.

In order to photograph a VIN plate located between a windshield 124 and dashboard 126 of a vehicle 128, shown schematically in FIG. 4, a camera operator will first attach the adapter 42 to the front of the camera 10 as shown by the dashed lines in FIG. 1 to form the camera and adapter combination shown in FIG. 4. The arms 102 and 104 of the mounting clamp 100 are inserted into the recess 40 in the shutter housing section 18 to the point where the grooves 106 and 108 snap into position on the cable housing (not shown). In this position, the aperture stop 92 is received within the opening surrounding the objective lens 22, the lower part of the back wall 46 abuts with the front face 20 of the shutter housing section 18, and the upper part of the back wall 46 abuts with the front face of the flash unit 28. Further, in this position, the light box window 84, viewfinder wedge 86, photocell wedge 88, and aperture stop 90 overlie the flash emitting element 30, viewfinder window 24, photocell window 26, and objective lens 22, respectively. Also, when the adapter is in the operative position shown in FIG. 4, the optical axis of the close-up lens 94 and the aperture 98 are co-axial with the optical axis 130 of the objective lens 22.

Once the adapter has been attached as described above, the operator will place the front wall 56 of the housing 44 against the windshield 124 of the vehicle 128 so that the objective window 58 generally overlies the VIN plate. Inasmuch as the adapter is approximately five inches in length, the camera lens will be automatically positioned approximately this distance above the windshield. To precisely position the object window 58 with respect to the VIN plate, the operator will depress the pressure switch 70 to actuate the preview illuminator 72 to illuminate the VIN plate through the windshield 130 while viewing the VIN plate through the viewfinder eyepiece 36. Without the illumination provided by the preview illuminator 72, it can be difficult to properly aim the adapter and camera combination over the VIN plate housing the camera viewfinder because the housing 44 blocks much of the ambient light which would otherwise illuminate the VIN plate. Using the viewfinder eyepiece 36, the operator can view both the VIN plate and the label 120 to ensure that the plate and the information bearing portion of the label are aligned with the object window 58. The final step for the camera operator is to depress the exposure cycle initiating button 38.

In response to depression of the exposure button 38, the electrical control system of the camera 10 initiates an exposure cycle as is well known in the instant camera art. Generally, a photocell located behind the photocell window 26 senses scene light and determines the need for a flash exposure. The camera exposure control system causes the shutter to open and activates the flash emitting element 30. The flash illumination passes through the light box window 84 and into the light box 60 where it strikes the mirror 110 and is reflected toward the diffusing screen 66. The light modulator 112 blocks at least some of the direct illumination from the flash emitting element 30 and is tapered at 114 to compensate for the fact that the emitting element 30 is located to one side of the optical axis 130. The illumination which passes through the diffusing screen 66 is not only diffused, but more importantly, is directed at a sharp angle with respect to the optical axis 130 so as to illuminate the VIN plate through the windshield 124 and the label 120 while providing a shadow from the VIN plate numbers and letters to enhance the photographic result. Since the aperture stop 90 increases the depth of field to several inches, the VIN plate and label information images are in focus even with the VIN plate being normally located a short distance behind he windshield 124. The viewfinder optical wedge 86 and the photocell optical wedge 88 correct for parallax due to the closeness, about 6 inches, of the VIN plate and label 120 to the viewfinder window 24 and the photocell window 26. The photocell located behind the photocell optical wedge 88 and the photocell window 26 senses the reflected flash illumination and provides a signal to the camera control system to quench the camera strobe and to close the camera shutter and end the exposure cycle.

The aperture stop in the present embodiment is a slit 98, which advantageously effectively accommodates the elongated VIN plate. Thus, while a circular small aperture stop could be utilized, the slit 98 aligned with the VIN plate provides a large depth of field to accommodate the variations in VIN plate position while considerably increasing the light transmission for exposure as compared to a circular aperture. In the preferred embodiment, the slit is approximately 1/16 inch wide and mounted in the end of the adapter 42 just over the surface of the camera lens 22 so as to increase the depth of field of the camera to 3 to 4 inches. Since the close-up lens 94, in conjunction with the camera lens 22, alters the camera fixed focus to approximately 6 inches, assembly of the 5 inch long adapter 42 to the camera 10 will cause the system to be best focused at approximately one inch beyond the distal end 58 of the adapter, as measured along the optical axis 130, and accounting for windshield thickness, will be best focused just less than one inch beyond or behind the windshield when the system is in operative position on a vehicle. Consequently, when the system is in operation, while its best focus will be just less than one inch behind the windshield, it will, due to the 3 to 4 inches depth of field, provide adequate photographic resolution for scene information located between just in front of the windshield to approximately 3 inches behind the windshield. Hence, the system nicely accommodates both the label (located just in front of the windshield) and the VIN plate whose distance varies behind the windshield.

It should be recognized that while the slit aperture importantly provides good depth of field to accommodate the variation in location of the VIN plate, with more exposure light than to be expected from a circular aperture, the system still requires a large amount of flash light which is provided by the efficient light directing section 60 in combination with the angled mounting plane of the end 58 of the adapter which facilitates a large flash of illumination through the windshield with minimum exposure interfering reflections therefrom.

As illustrated in FIGS. 1 and 2, the longitudinal axis of the slit 98 is parallel to the plane of the base 54 of the adapter and to the longitudinal axis of the object window 58, and when assembled to the camera 10 is parallel to its base 12. With respect to the latter, however, it should also be understood that the slit 98, the object window and the label support, while remaining parallel to each other, may be rotated at any angle with respect to the camera (e.g., at 90° to the camera base 12) to accommodate particular operator positions for photographing the VIN plate wile standing alongside the vehicle. For the present camera 10, rotation of the adapter 90° from that illustrated will orient the image of the VIN plate (and that of the label) normal to the bottom edge of the film. For a dedicated camera arrangement, however, any angle with respect to the camera arrangement and film imaging may be accommodated.

Thus, it will be appreciated that as a result of the present invention, a highly effective vehicle identification apparatus for photographing vehicle identification numbers through the windshield of the vehicle is provided and by which the stated objectives, among others, are completely fulfilled. The vehicle identification apparatus of the present invention has, for example, the advantage of facilitating the performance of an automobile insurance adjuster who has to appraise the damage done to a particular automobile. The adjuster can use a conventional un-modified instant camera to photograph the damaged portion of the automobile and the automobile license plate, etc. Then, the adjuster can attach the present vehicle identification adapter to the camera and photograph the VIN of the automobile. It is contemplated that modifications, changes or both modifications and changes may be made in the illustrated embodiment without departure from the invention. For example, while the illustrated and described embodiment is adapted for use with a viewfinder type instant camera, it is contemplated that the adapter may be modified for use with a single lens reflect camera.

In the illustrated embodiment, the camera apparatus includes a camera and adapter, and as indicated previously, the invention can be accommodated in a single unit. In the latter case, as previously indicated, any angle of orientation between the camera viewing system, the holding of the camera by the operator and the film, can be utilized depending on various design considerations. The strobe and light directing arrangement may be provided as an integral unit adjoining the object window, and other aspects of the camera, such as the viewing and light evaluation, modified and positioned as desired.

It will be apparent to those skilled in the art from the foregoing description and accompanying drawings that additional modifications, changes or both modifications and changes may be made, again without departure from the invention. Accordingly, it is expressly intended that the foregoing description and accompanying drawings are illustrative of a preferred embodiment only, not limiting, and that the true spirit and scope of the present invention be determined by reference to the appended claims.

What is claimed is:

1. Photographic apparatus for close-up photography of an object through a transparent medium, said apparatus comprising:

a housing having a first section defining an exposure chamber including a lens located in a wall of said first section for directing image forming rays into said chamber from a photographic scene located forwardly along the optical axis of said lens, and a second section extending forwardly of said lens a given predetermined distance along said optical axis and terminating at its distal end in an object window defining an apparatus mounting plane configured for locating said lens at said predetermined distance from said transparent medium when said distal end of said second section is placed in engagement with said transparent medium;

flash illuminating and directing means carried by said housing for producing a flash of illumination directed at the distal end of said second section to illuminate the scene behind the medium; and said distal end of said second section defining said camera mounting plane at an oblique angle to said optical axis to permit exposure of the scene area located on said optical axis behind the medium while minimizing reflection of said flash from the medium along said optical axis.

2. The apparatus of claim 1 wherein said second section is an opaque tubular member.

3. The apparatus of claim 1 including an elongated aperture stop of narrow width configured to be aligned with the longitudinal axis of said object for providing a large depth of field so as to accommodate varied distances of the object behind the medium.

4. The apparatus of claim 3 wherein the object is a narrow, elongated member and said aperture stop is a slit having its longitudinal axis aligned with a principle axis of said object window.

5. The apparatus of claim 1, further comprising label holding means adjacent said object window of supporting a label in a position to be photographed along with the object.

6. The apparatus of claim 1 including a viewfinder for viewing the scene, and preview means for illuminating the object so as to enable a camera operator to view the object through the medium when the apparatus is in an operative position over the medium.

7. The apparatus of claim 1 wherein the object is a vehicle identification number plate mounted behind a vehicle windshield and the transparent medium is the vehicle windshield.

8. An adapter for use with a camera for closeup photography of a narrow, elongated object, said camera having an objective lens, a given lens optical axis and a source of flash illumination, said adapter comprising a housing carrying in overlying relationship a close-up lens and aperture stop, means for releasably attaching said housing to said camera with said close-up lens and aperture stop in overlying relation to the lens of said camera, and said aperture stop is a narrow strip configured for increasing the depth of field of said camera while accommodating photographing of said narrow object.

9. A vehicle identification adapter for use with a camera having an objective lens, a given lens optical axis and a source of flash illumination to photograph a vehicle identification number plate through a vehicle windshield, said adapter comprising:
  a housing having an object window in one end, a close-up lens and an aperture stop in an other end, means located at said one end for mounting the camera on said one end with the lens optical axis exit ending through said close-up lens, said stop and said object window, and said housing having a length establishing a predetermined distance between the camera and said windshield when said camera and adapter are in an operative position over said windshield with said one end placed against said windshield and said camera mounted on said other end; and
  said close-up lens and aperture stop being coaxially supported in said other end of said housing in alignment with said given lens optical axis and said aperture stop sufficiently reduces the camera aperture so as to increase the depth of field of the camera to adequately encompass expected variations in the distance of the vehicle identification number plate behind the vehicle windshield when said camera is mounted on said adapter.

10. The adapter of claim 8 including means for receiving illumination from said source and for directing at least a portion of the received illumination at a sharp angle to said given optical axis so as to form a shadow effect about the identification number on said vehicle identification number plate to thereby enhance its readability in the photographic image.

11. The adapter of claim 10 wherein said directing means includes means for directing the received illumination through said object window.

12. The adapter of claim 8 further comprising label holding means for supporting a label in a position to be photographed along with the vehicle identification number plate, and said illumination directing means includes means for additionally directing flash illumination to said label holding means.

13. The adapter of claim 8 wherein said camera further includes a viewfinder, said adapter further comprising:
  preview means for illuminating the vehicle identification number plate so as to enable a camera operator to view the vehicle identification number plate through the viewfinder while the camera and adapter are in an operative position over the plate.

14. The adapter of claim 8 wherein said illumination directing means comprises a light box section of said housing having a diffusing screen adjoining said one end of said housing.

15. The adapter of claim 14 wherein said housing includes an opaque baffle which divides a portion of the interior of the housing into said light box section and an exposure section, and said light box section includes a reflector located near said one end of said housing for directing the flash illumination produced by said source of flash illumination through said diffusing screen at a sharp angle to the optical axis of the objective lens.

16. The adapter of claim 15 wherein the diffusing screen includes means for compensating for an offset location of the source of flash illumination.

17. The adapter of claim 8 wherein said one end of said housing is slanted at an oblique angle to said optical axis to minimize reflection from said windshield along said optical axis.

18. The adapter of claim 17 wherein said aperture stop comprises an opaque member having a medial slit running parallel to an edge of said object window.

19. An adapter for photographing a vehicle identification number plate through the windshield of a vehicle using an instant camera having an objective lens and a built-in electronic flash unit, said adapter comprising:
  a housing having top, bottom, first and second side, front and rear walls defining an interior;
  the interior being separated into an upper illumination chamber and a lower exposure chamber by a planar baffle and a diffusing screen;
  said front wall having a rectangular object window and the plane of said front wall is oriented at an acute angle with respect to said bottom wall;
  said rear wall supporting a light window, a viewfinder window, a photocell window, a close-up lens and aperture stop arrangement, and a mounting clamp adapted to secure said adapter to said camera.

20. The adapter of claim 19 further comprising a preview illuminator mounted with said exposure chamber and including an actuating element accessible through an opening in one of said side walls.

21. The adapter of claim 20 including means for mounting an information label adjacent said object window.

* * * * *

UNITED STATES PATENT AND TRADEMARK OFFICE
CERTIFICATE OF CORRECTION

PATENT NO. : 4,855,770
DATED : August 8, 1989
INVENTOR(S) : Donald E. Mauchan & Frederick Slavitter It is certified that error appears in the above-indentified patent and that said Letters Patent is hereby corrected as shown below:

Col. 9, line 52, change "claim 8" to --- claim 9 ---.

Col. 10, line 1, change "claim 8" to --- claim 10 ---.

Col. 10, line 7, change "claim 8" to --- claim 9 ---.

Col. 10, line 15, change "claim 8" to --- claim 10 ---.

Col. 10, line 30, change "claim 8" to --- claim 9 ---.

Signed and Sealed this

Nineteenth Day of April, 1994

Attest:

BRUCE LEHMAN

Attesting Officer          Commissioner of Patents and Trademarks